United States Patent
Mall et al.

(10) Patent No.: US 11,206,315 B2
(45) Date of Patent: Dec. 21, 2021

(54) SYSTEMS AND METHODS FOR AUTOMATIC USER PROFILE SWITCHING

(71) Applicant: Microsoft Technology Licensing, LLC, Redmond, WA (US)

(72) Inventors: Mohamed Mall, Sydney (AU); Felix Gerard Torquil Ifor Andrew, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/682,932

(22) Filed: Nov. 13, 2019

(65) Prior Publication Data

US 2021/0144229 A1 May 13, 2021

(51) Int. Cl.
*H04L 29/08* (2006.01)
*G06F 16/955* (2019.01)
*H04L 12/24* (2006.01)
*H04L 29/12* (2006.01)

(52) U.S. Cl.
CPC ........ *H04L 67/306* (2013.01); *G06F 16/9558* (2019.01); *G06F 16/9562* (2019.01); *H04L 41/0859* (2013.01); *H04L 61/1511* (2013.01); *H04L 61/3025* (2013.01)

(58) Field of Classification Search
None
See application file for complete search history.

(56) References Cited

U.S. PATENT DOCUMENTS

| | | | |
|---|---|---|---|
| 6,725,269 B1 | 4/2004 | Megiddo | |
| 8,578,036 B1 | 11/2013 | Holfelder et al. | |
| 10,127,388 B1* | 11/2018 | Popuveniuc | G06F 21/60 |
| 2004/0049673 A1 | 3/2004 | Song et al. | |
| 2008/0281696 A1* | 11/2008 | Whitehead | G06Q 30/0251 705/14.41 |
| 2012/0042280 A1* | 2/2012 | Hoffman | H04L 67/306 715/800 |
| 2014/0157377 A1 | 6/2014 | Kiryakos et al. | |
| 2019/0114673 A1* | 4/2019 | Gupta | G06Q 30/0242 |
| 2019/0286756 A1* | 9/2019 | Sweeney | G06F 40/16 |

OTHER PUBLICATIONS

"International Search Report and Written Opinion Issued in PCT Application No. PCT/US20/057263", dated Jan. 21, 2021, 11 Pages.

* cited by examiner

*Primary Examiner* — James A Edwards

(57) ABSTRACT

Aspects of the present disclosure include systems and methods for profile switching by the computing device. In an example, a computing device may include a memory storing instructions and a processor communicatively coupled with the memory and configured to execute the instructions. The processor may receive a request to initiate a new instance of a website. The processor may also determine a domain name of the website in response to the request. The processor may also determine a first user profile from a plurality of user profiles that corresponds to the domain name based on profile information corresponding to one or more of profile history data, profile favorites data, or administrative settings data. The processor may also launch the new instance of the web site in a browser according to the first user profile.

20 Claims, 5 Drawing Sheets

SYSTEMS AND METHODS FOR AUTOMATIC USER PROFILE SWITCHING

BACKGROUND

The present disclosure relates to computing devices, and more particularly, to systems and methods for automatic profile switching by a computing device.

A user profile may provide a custom experience for a user on a domain or website based on stored settings such as browsing settings, bookmarks, or saved passwords. For example, when a user visits a website, the website may request for user profile information (e.g., username and password). Once the user profile information is entered, the browser may save the user profile information and the website may store browsing information (e.g., cookies) related to the user profile information. In this example, the website may remember products viewed by the user to provide recommendations to the user during the current visit or on a next visit to the website. Typically, a user visits a website without providing any user profile information or a browser automatically provides the website with user profile information entered during a previous visit to the website. However, in some situations, the browser may provide the website with the user profile information but the user may prefer to use an alternative user profile associated with the website.

Accordingly, there is a need in the art for improvements to user profile switching.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a computing device including a memory storing instructions for profile switching by the computing device and a processor communicatively coupled with the memory, is disclosed. The processor may be configured to execute the instructions to receive a request to initiate a new instance of a website. determine a domain name of the website in response to the request. The processor may also be configured to execute the instructions to determine a first user profile from a plurality of user profiles that corresponds to the domain name based on user profile information corresponding to one or more of profile history data, profile favorites data, or administrative settings data. The processor may also be configured to execute the instructions to launch the new instance of the website in a browser according to the first user profile.

In another aspect, a method for profile switching by a computing device is disclosed. The method may include receiving a request to initiate a new instance of a website. The method may also include determining a domain name of the website in response to the request. The method may also include determining a first user profile of a plurality of user profiles corresponds to the domain name based on user profile information corresponding to one or more of profile history data, profile favorites data, or administrative settings data. The method may also include launching the new instance of the website in a browser according to the first user profile.

In another aspect, a computer-readable medium storing instructions executable by a processor is disclosed. The computer-readable medium may include instructions to receive a request to initiate a new instance of a web site. The computer-readable medium may also include instructions to determine a domain name of the web site in response to the request. The computer-readable medium may also include instructions to determine a first user profile of a plurality of user profiles corresponds to the domain name based on user profile information corresponding to one or more of profile history data, profile favorites data, or administrative settings data. The computer-readable medium may also include instructions to launch the new instance of the web site in a browser according to the first user profile.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for automatic user profile switching by a computing device. In an example, the systems and methods disclosed herein may allow a computing device to switch user profiles based on user profile information including one or more of user preferences, past use of a user profile, favorite settings, domain name, subdomain, query parameters of a uniform resource locator (URL), or administrative settings.

For example, a browser may support multiple user profiles such as @microsoft.com or @outlook.com. When a user visits a website (e.g., an online shopping site) for a personal reason, the user may want to use the user profile under @outlook.com, and when the user visits a website (e.g., sharepoint.microsoft.com) for a business reason, the user may want to use the user profile under @microsoft.com. In another example, when a user clicks on a link sent in an email, a browser may launch but the browser does not know which account or user profile the user would like to use. If the URL associated with the link relates to work, a work related user profile would be ideal, and if the URL is social, a personal related user profile would be ideal. According to aspects of the present disclosure, the browser may switch user profiles based on the user profile information. Further, when the user switches user profiles manually, the browser may be configured to prompt the user to provide an indication of whether the switch is a permanent switch, and record the indication accordingly.

Turning now to the figures, examples of systems and methods for automatic user profile switching by a computing device are depicted. It is to be understood that aspects of the figures may not be drawn to scale and are instead drawn for illustrative purposes.

Figure 1:
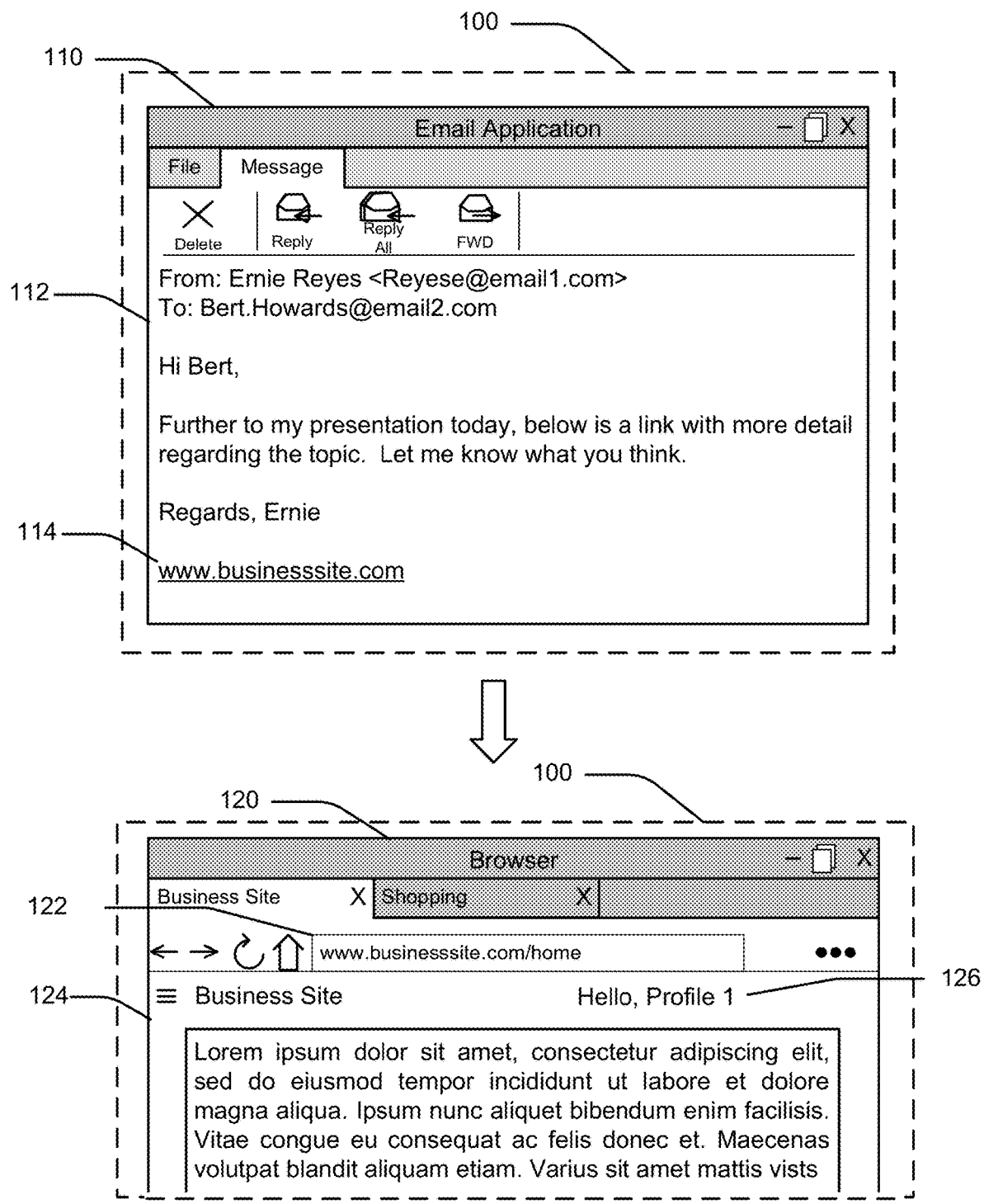
FIG. 1 is a conceptual view of an example user interface of a computing device, according to aspects of the present disclosure.

Referring to FIG. 1, a conceptual view of an example user interface 100 of a computing device is depicted. Examples of the computing device may include a cellular phone, a smart phone, a laptop, a personal digital assistant (PDA), a multimedia device, a video device, a digital audio player (e.g., MP3 player), a camera, a game console, a tablet, a smart device, a wearable device, a large or small kitchen appliance, IoT devices, or any other similar functioning device that is capable of displaying the user interface 100.

As shown, the user interface 100 may display a first application 110 (e.g., email application) for interaction with a user. In an example, content 112 of the first application 110 may display a link 114 for the user to access a website (e.g., www.businesssite.com). In response to the link 114 being selected by the user, the user interface 100 may transition to a browser 120 to display content 124 of a website 122 corresponding to the link 114.

In some situations, the browser 120 may determine whether the website 122 was accessed under a first user profile 126 (e.g. Profile 1) at a previous visit to the website 122, and reuses the first user profile from the previous visit to the website 122. In other words, a profile manager for the browser 120 typically retains user profile information which includes the website 122 and credentials (e.g., username and password) associated with (or used during) the last visit to the website 122. However, in some examples, the user may want the website 122 to be displayed under a different user profile (e.g., Profile 2) than the last used user profile to visit the website 122.

Aspects of the present disclosure describe a profile manager for the browser 120 which allows the browser 120 to switch user profiles based on one or more of a password list, user profile history, an administrative settings, or a profile favorites setting. In some examples, the profile manager of the browser 120 may further use domain name, subdomain name, and or query parameters in determining which user profile to use.

Figure 2:
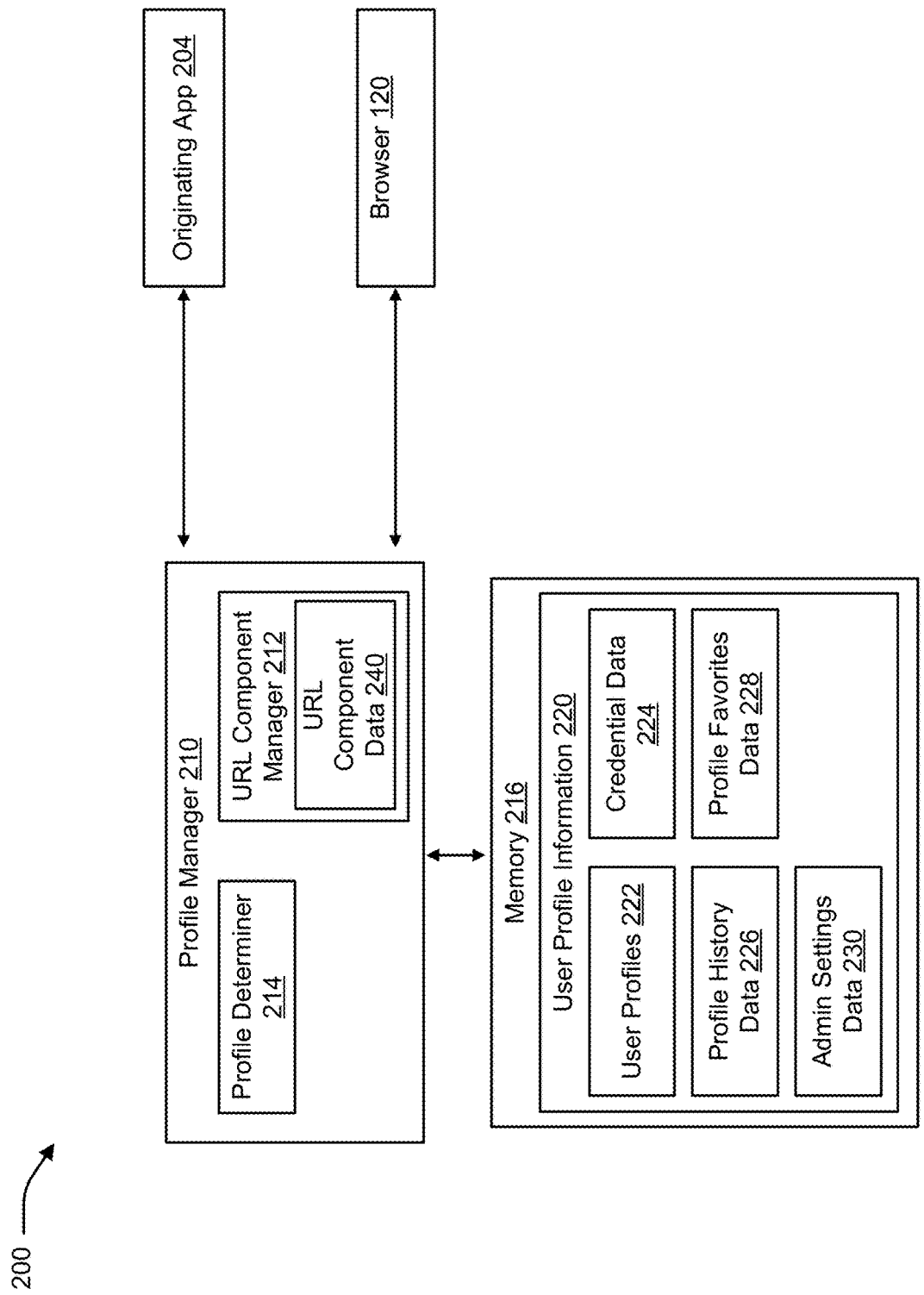
FIG. 2 is a conceptual view of an example computing device, according to aspects of the present disclosure.

Referring to FIG. 2, a conceptual view of an example computing device 200 for profile switching is depicted. In an aspect, the computing device 200 may include a profile manager 210 configured to manage a plurality of user profiles 222 and to select a user profile from the plurality of user profiles 222 to launch a website in the browser 120.

In an aspect, the profile manager 210 may communicate with an originating application 204 to receive a request (e.g., link 114) to access a website (e.g., website 122) and may provide information to the browser 120 for the website to be launched under a selected user profile based on user profile information 220. In an example, the originating application 204 may be any application installed on the computing device 200 (e.g., first application 110 or browser 120) or any online application (e.g., online email application) accessed by the computing device 200.

In an example, the profile manager 210 may include a URL component manager 212 configured to receive the request from the originating application 204 and determine URL component data 240 corresponding to a URL associated with the request. For example, the URL component manager 212 may determine the URL component data 240 by parsing a domain name, a subdomain name, a path, and/or a query parameter from a URL (e.g., www.businesssite.com) associated with the request.

In an aspect, the profile manager 210 may also include a profile determiner 214 configured to determine a first user profile from a plurality of user profiles 222 that corresponds to the domain name based on the user profile information 220. In an example, the profile determiner 214 may receive the user profile information 220 from a memory 216.

In an aspect, the user profile information 220 may include user profiles 222, credential data 224, profile history data 226, profile favorites data 228, or administrative (admin) settings data 230. In an example, the user profiles 222 may include data indicating user profiles such as profile names or profile identifiers that correspond to websites.

In an example, the credential data 224 may include data indicating credentialing information corresponding to the user profiles 222 and used to accessed websites. For example, the credential data 224 may include usernames and/or passwords corresponding to the user profiles 222 and the websites.

In an example, the profile history data 226 may include data indicating historical access information of the user profiles 222 in accessing the websites. For example, the profile history data 226 may include a number of visits the user profiles 222 have made to websites, a duration of these visits to the websites, and/or a schedule (e.g., time of day, day of week) of these visits to the websites.

In an example, the profile favorites data 228 may include data indicating favorite settings (e.g., as indicated by the user) corresponding to user profiles 222 and the websites. For example, the profile favorites data 228 may indicate user profiles which users have selected to be used when accessing corresponding websites.

The administrative settings data 230 may include data indicating settings (or restrictions) corresponding to the user profiles 222 and the websites. In some examples, the administrative settings data 230 may allow or restrict a website from being launched under a user profile such as restrictions to personal profiles to a business intranet website.

In an example, to determine a first user profile, the profile determiner 214 may review the user profile information 220 and URL component data 240 and determine one or more user profiles 222 that correspond to a domain name of the URL of the request. When a single user profile is determined to correspond to the domain name of the URL of the request, the profile determiner 214 may determine whether to open the URL under the single user profile 222 based on the user profile information 220. For example, the profile determiner 214 may verify that the administrative settings data 230 allows the single user profile 222 to be used when launching the website.

When multiple user profiles 222 correspond to a domain name of the URL of the request, the profile determiner 214 may determine which one of the multiple user profiles 222 to provide to the browser 120 to launch the website. In an example, the profile determiner 214 may look to the profile history data 226, the profile favorites data 228, and the administrative settings data 230 to determine whether one user profile 222 should be selected over another user profile 222. For example, the data of the user profile information 220 may be weighted such that some of the data is weighted over other data. In some examples, the user profile information 220 may be weighted based on a descending sequential order of weight such as the administrative settings data 230 may have a greater weight than the profile favorites data 228, which may have a greater weight than the profile history data 226.

Further, the profile determiner 214 may look to the URL component data 240 to further determine one of the multiple user profiles 222 to provide to the browser 120. For example, the URL component data 240 may be compared to the credential data 224, the profile history data 226, the profile favorites data 228, and/or the administrative settings data 230 to determine whether the URL component data 240 (e.g., subdomain name or query parameters) indicates which user profile 222 of the multiple user profiles 222 to provide to the browser 120.

Once a user profile 222 has been determined (or selected), the profile determiner 214 may send the determined user profile 222 to the browser 120 to launch the website under the determined user profile 222. In an example, if a current browser window is open, the browser 120 may use the current browser window to launch the website under the determined user profile 222. In another example, if there are more than one browser windows open, the browser 120 may use the most recently used browser window to launch the website under the determined user profile 222. In another example, if there is no browser window open, the browser 120 may open a new browser window and use the new browser window to launch the website under the determined user profile 222.

Figure 3:
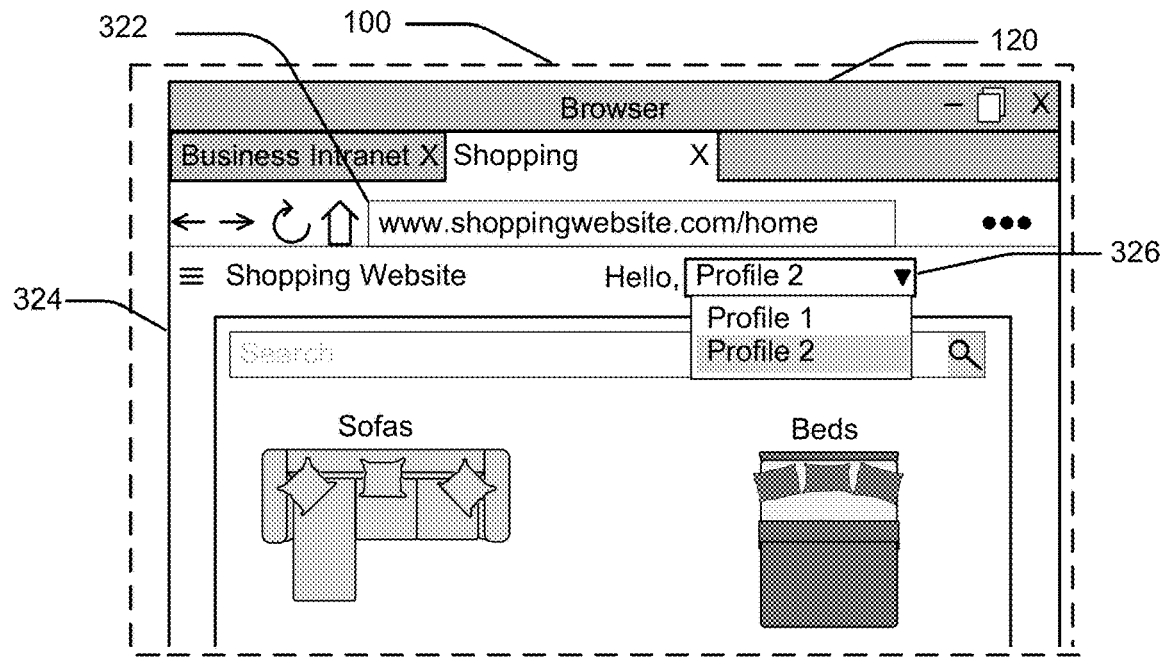
FIG. 3 is another conceptual view of an example user interface of a computing device, according to aspects of the present disclosure.
Figure 3:
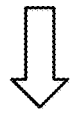
Figure 3:
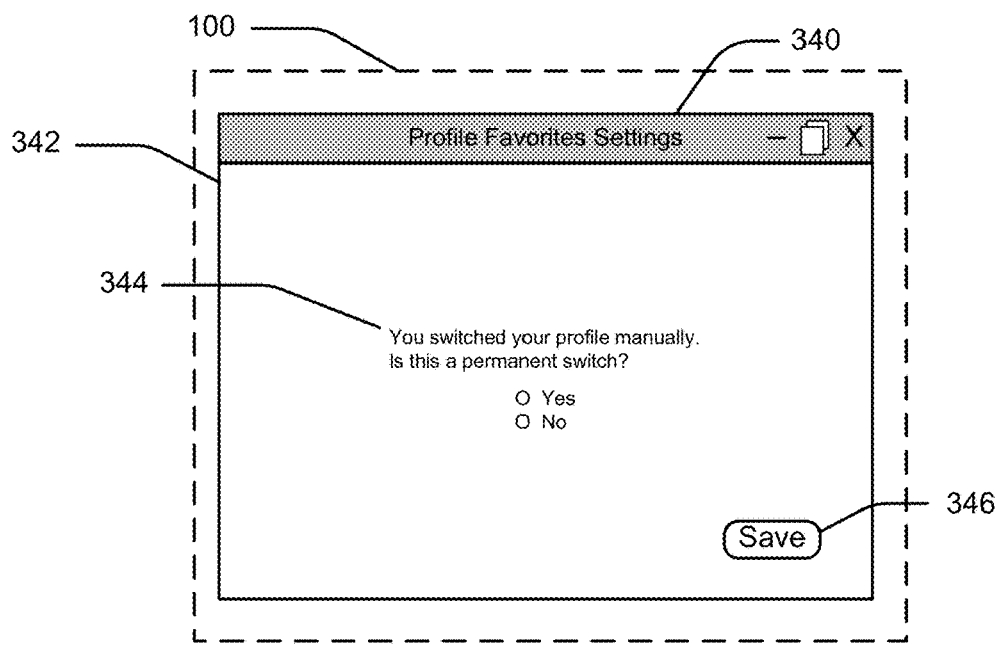

Referring to FIG. 3, another conceptual view of the example user interface 100 is depicted. In this example, the browser 120 may have transitioned to a website 322 under a first profile (e.g., Profile 1) received from the profile manager 210 based on the user profile information 220. However, there may be multiple user profiles 326 that correspond to the website 322. Accordingly, the user may select a second profile (e.g., Profile 2) as the user profile for the web site 322.

In response to manually changing to the second profile, content 324 of the web site 322 may reflect the change in user profiles. For example, the content 324 for the website 322 may display couches, as shown by FIG. 3, based on the second profile (e.g., Profile 2) having been selected, whereas the content 324 may display types of furniture different than couches based on the first profile (e.g., Profile 1).

Further in response to manually changing to the second profile, a profile favorites settings window 340 may display in the user interface 100. The profile favorites settings window 340 may include content 342 that provide the user with one or more selections 344 to select whether the second profile (i.e., user selected profile) should be designated as permanent profile switch (e.g., "favorite" profile) for a next visit to the website 322. The user may select the one or more selections 344 and save (e.g., by selecting save button 346) the selection 344 as profile favorites data 228.

Figure 4:
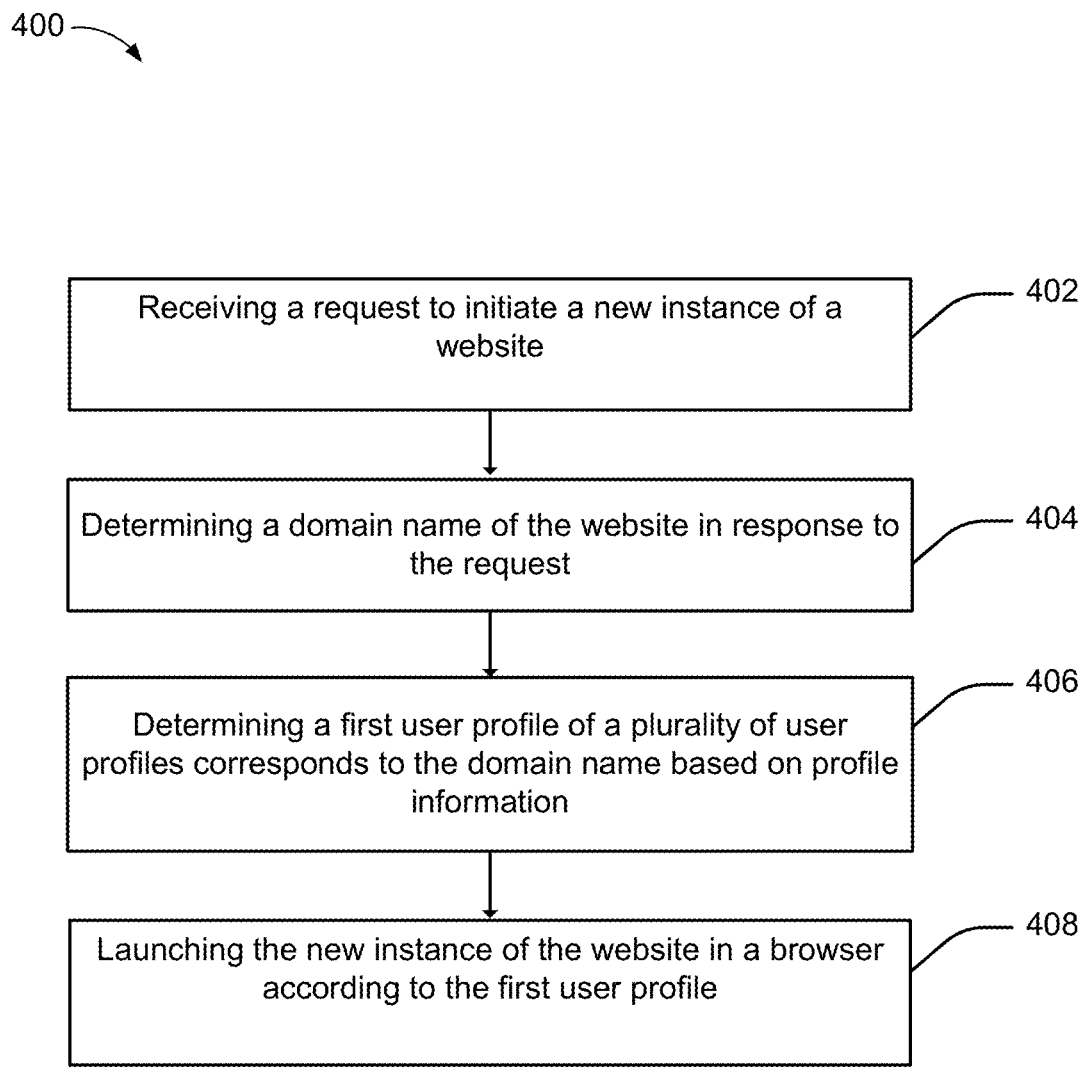
FIG. 4 is a flowchart of an example method for profile switching by the computing device of FIG. 2, according to aspects of the present disclosure.

Referring to FIG. 4, an example method 400 for profile switching by a computing device is depicted. In an example, the method 400 may be performed by the computing device 200 of FIG. 2 and one or more components of the computing device 200, as described herein (see e.g., FIGS. 2 and 5). Examples of the operations of the method 400 may be described in relation to FIGS. 1-3 and 5.

At 402, the method 400 may include receiving a request to initiate a new instance of a website. For example, the computing device 200 and/or one or more components (e.g., processor 502, profile manager 210, and/or URL component manager 212) of the computing device 200 may receive a request to initiate a new instance of the website 122. In an example, the request may be received from the originating application 204. Examples of the originating application 204 may be any application installed on the computing device 200 (e.g., first application 110 or browser 120) or any online application (e.g., online email application) accessed by the computing device 200. In an example, the request may include a URL (e.g., URL 114) of the website (e.g., website 122).

At 404, the method 400 may include determining a domain name of the website in response to the request. For example, the computing device 200 and/or one or more components (e.g., processor 502, profile manager 210, and/or URL component manager 212) of the computing device 200 may determine a domain name of the website 122 in response to the request. For example, the URL component manager 212 may parse the components of the URL from the request to determine the domain name of the website.

At 406, the method 400 may include determining a first user profile from a plurality of user profiles that corresponds to the domain name based on user profile information. For example, the computing device 200 and/or one or more components (e.g., processor 502, profile manager 210, and/or profile determiner 214) of the computing device 200 may determine a first user profile from the plurality of user profiles 222 that corresponds to the domain name based on the user profile information corresponding to one or more of the credential data 224, the profile history data 226, the profile favorites data 228, or the administrative settings data 230.

In some examples, the method 400 may also include comparing the user profile information with the domain name, and determine whether the user profile information corresponding to the first user profile corresponds to the domain name. For example, the computing device 200 and/or one or more components (e.g., processor 502, profile manager 210, and/or profile determiner 214) of the computing device 200 may, to determine the first user profile, compare the user profile information 220 with the domain name, and determine whether the user profile information 220 corresponding to the first user profile corresponds to the domain name.

In some examples, the method 400 may also include determining multiple user profiles of the plurality of user profiles correspond to the domain name, wherein the multiple user profiles include the first user profile, and selecting the first user profile from the multiple user profiles based on the user profile information corresponding to one or more of a subdomain name or query parameters of a URL. For example, the computing device 200 and/or one or more components (e.g., processor 502, profile manager 210, and/or profile determiner 214) of the computing device 200 may, to determine the first user profile, compare the user profile information 220 with URL component data 240.

At 408, the method 400 may include launching the new instance of the website in a browser according to the first user profile. For example, the computing device 200 and/or one or more components (e.g., processor 502, profile manager 210, and/or profile determiner 214) of the computing device 200 may launch the new instance of the website 122 in the browser 120 according to the first user profile. In an example, the profile manager 210 may send information for the browser 120 to launch the website 122 under the first user profile.

Figure 5:
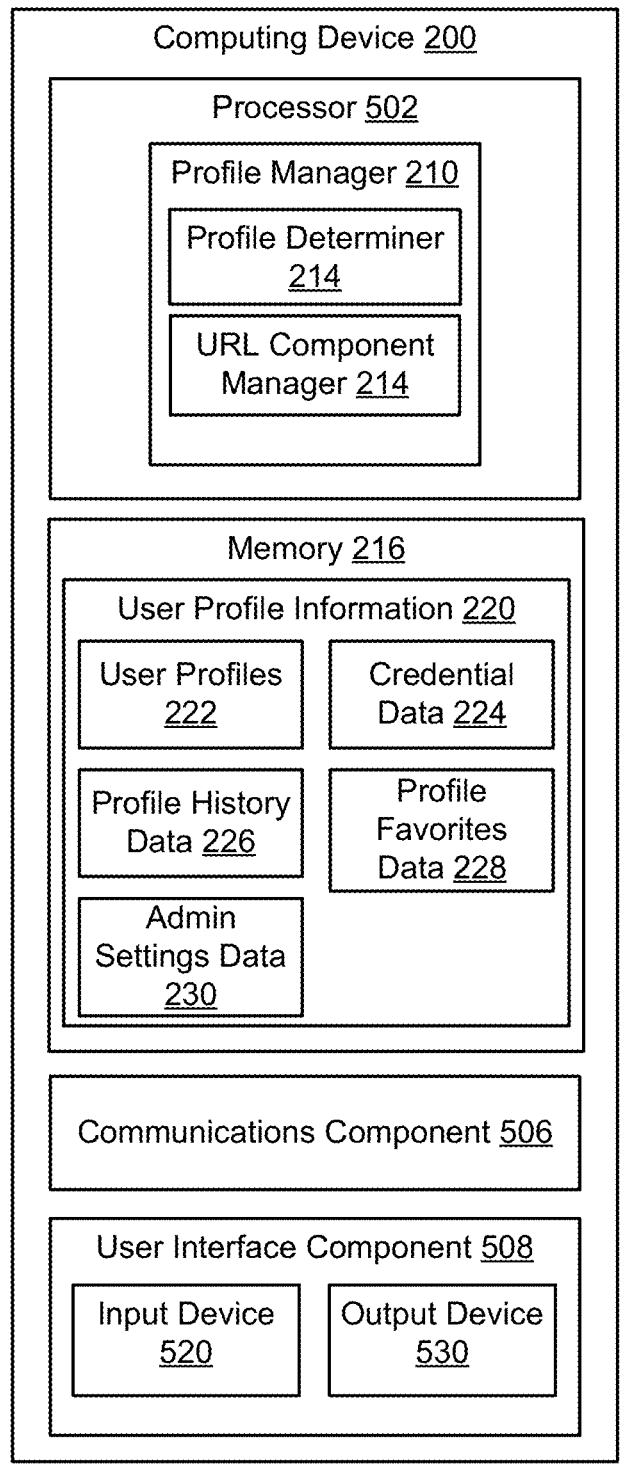
FIG. 5 is a block diagram of additional components of the example computing device of FIG. 2, according to aspects of the present disclosure.

Referring now to FIG. 5, illustrated is an example of components of the computing device 200 in accordance with an implementation, including additional component details as described herein. In one example, the computing device 200 may include a processor 502 for carrying out processing functions associated with one or more of the components and the functions described herein. The processor 502 may include a single processor or a multiple set of processors or multi-core processors. Moreover, the processor 502 may be implemented as an integrated processing system and/or a distributed processing system. In an implementation, for example, the processor 502 may include the profile manager 210, the profile determiner 214, and/or the URL component manager 212.

In an example, the computing device 200 may include memory 216 for storing instructions executable by the processor 502 for carrying out the functions described herein. Further, the memory 216 may store the user profile information 220 including the user profiles 222, the credential data 224, the profile history data 226, the profile favorites data 228, or the administrative settings data 230, as described herein.

The computing device 200 may include a communications component 506 that provides for establishing and maintaining communications with one or more devices utilizing hardware, software, and services, as described herein. The communications component 506 may carry communications between components on the computing device 200, as well as between the computing device 200 and external devices and devices located across a communications network and/or devices serially or locally connected to the computing device 200. For example, the communications component 506 may include one or more buses, and may further include transmit chain components and receive chain components associated with a transmitter and receiver, respectively, operable for interfacing with external devices. In an example, the communications component 506 may communicate with other devices using one or more technologies such as, but not limited to, WiFi, Bluetooth, infrared, or any other technology configured to receive a signal with which the computing device 200 may use for profile switching.

Computing device 200 may also include a user interface component 508 operable to receive inputs from a user and/or a sensor of the computing device 200 and further operable to generate outputs for presentation (e.g., user interface 100) to the user. The user interface component 508 may include one or more input devices 520 including but not limited to a keyboard, a number pad, a mouse, a display (e.g., touch-sensitive), a digitizer, a navigation key, a function key, a voice recognition component, any other mechanism capable of receiving an input from a user or sensor, or any combination thereof. Further, the user interface component 508 may include one or more output devices 530, including but not limited to the display, a speaker, a haptic feedback mechanism, a printer, any other mechanism capable of presenting an output to a user, or any combination thereof. In an example, the output device 530 (e.g., display) may present the user interface 100.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, including non-transitory computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computing device, comprising:
   a memory storing instructions for profile switching by the computing device;
   a processor communicatively coupled with the memory and configured to execute the instructions to:
      receive a request to initiate a new instance of a website;
      determine a domain name of the website in response to the request;
      select, by a web browser, a first user profile for accessing the website, wherein the first user profile is selected, based on the domain name, from a plurality of user profiles that are supported by the web browser for use in visiting websites, wherein each of the plurality of user profiles are associated with corresponding credentials used to access websites via the user profiles, and wherein selecting the first user profile is further based on user profile information corresponding to one or more of profile history data, profile favorites data, or administrative settings data; and
      launch, based on selecting the first user profile, the new instance of the website in the web browser using the first user profile supported by the web browser.

2. The computing device of claim 1, wherein the processor is further configured to execute the instructions to:
   compare the user profile information with the domain name; and
   determine whether the user profile information corresponding to the first user profile corresponds to the domain name of a uniform resource locator (URL).

3. The computing device of claim 1, wherein the profile history data includes historical access information of user profiles used to access the website.

4. The computing device of claim 1, wherein the administrative settings data indicates one or more instructions to launch the new instance of the website based on group administrative information corresponding to a group of users.

5. The computing device of claim 1, wherein the profile favorites data indicates one or more instructions to launch the new instance of the website based on user preference information.

6. The computing device of claim 1, wherein the request to initiate the new instance of the website is received from a first application different than the web browser.

7. The computing device of claim 1, wherein the user profile information further corresponding to credential data.

8. A method for profile switching by a computing device, comprising:
   receiving a request to initiate a new instance of a website;
   determining a domain name of the website in response to the request;
   selecting, by a web browser, a first user profile for accessing the website, wherein the first user profile is selected, based on the domain name, from a plurality of user profiles that are supported by the web browser for use in visiting web sites, wherein each of the plurality of user profiles are associated with corresponding credentials used to access websites via the user profiles, and wherein selecting the first user profile is further based on user profile information corresponding to one or more of profile history data, profile favorites data, or administrative settings data; and
   launching, based on selecting the first user profile, the new instance of the web site in the web browser using the first user profile supported by the web browser.

9. The method of claim 8, wherein the determining the first user profile of the plurality of user profiles comprises:
   comparing the user profile information with the domain name; and
   determining whether the user profile information corresponding to the first user profile corresponds to the domain name of a uniform resource locator (URL).

10. The method of claim 8, wherein the profile history data includes historical access information of user profiles used to access the website.

11. The method of claim 8, wherein the administrative settings data indicates one or more instructions to launch the new instance of the website based on group administrative information corresponding to a group of users.

12. The method of claim 8, wherein the profile favorites data indicates one or more instructions to launch the new instance of the website based on user preference information.

13. The method of claim 8, wherein the request to initiate the new instance of the website is received from a first application different than the web browser.

14. The method of claim 8, wherein the user profile information further corresponding to credential data.

15. A non-transitory computer-readable medium storing instructions executable by a processor, comprising:
   instructions to receive a request to initiate a new instance of a web site;
   instructions to determine a domain name of the website in response to the request;
   instructions to select, by a web browser, a first user profile for accessing the website, wherein the first user profile is selected, based on the domain name, from a plurality of user profiles that are supported by the web browser for use in visiting websites, wherein each of the plurality of user profiles are associated with corresponding credentials used to access websites via the user profiles, and wherein selecting the first user profile is further based on user profile information corresponding to one or more of profile history data, profile favorites data, or administrative settings data; and instructions to launch, based on selecting the first user profile, the new instance of the website in the web browser using the first user profile supported by the web browser.

16. The non-transitory computer-readable medium of claim 15, further comprising:

instructions to compare the user profile information with the domain name; and instructions to determine whether the user profile information corresponding to the first user profile corresponds to the domain name of a uniform resource locator (URL).

17. The non-transitory computer-readable medium of claim 15, wherein the profile history data includes historical access information of user profiles used to access the website.

18. The non-transitory computer-readable medium of claim 15, wherein the administrative settings data indicates one or more instructions to launch the new instance of the website based on group administrative information corresponding to a group of users.

19. The non-transitory computer-readable medium of claim 15, wherein the profile favorites data indicates one or more instructions to launch the new instance of the website based on user preference information.

20. The non-transitory computer-readable medium of claim 15, wherein the request to initiate the new instance of the website is received from a first application different than the web browser.

* * * * *